(12) United States Patent
Patwardhan et al.

(10) Patent No.: US 11,916,758 B2
(45) Date of Patent: Feb. 27, 2024

(54) NETWORK-ASSISTED APPLICATION-LAYER REQUEST FLOW MANAGEMENT IN SERVICE MESHES

(71) Applicant: Cisco Technology, Inc., San Jose, CA (US)

(72) Inventors: Sourabh S. Patwardhan, Milpitas, CA (US); Maithili Narasimha, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 16/530,874

(22) Filed: Aug. 2, 2019

(65) Prior Publication Data

US 2021/0036935 A1 Feb. 4, 2021

(51) Int. Cl.
*H04L 41/5022* (2022.01)
*H04L 47/11* (2022.01)
(Continued)

(52) U.S. Cl.
CPC ...... *H04L 41/5022* (2013.01); *G06F 9/45558* (2013.01); *H04L 41/5009* (2013.01);
(Continued)

(58) Field of Classification Search
CPC ............ H04L 41/5022; H04L 41/5009; H04L 43/0882; H04L 47/11; H04L 43/10; H04L 43/0817; H04L 12/4633; H04L 41/046; H04L 41/0816; H04L 41/12; H04L 43/0811; H04L 43/0876; H04L 43/16; H04L 45/22; H04L 47/32; H04L 12/4641; H04L 41/0654; H04L 41/0668; H04L 41/083; H04L 41/0896; H04L 41/14; H04L 41/145; H04L 41/16; H04L 41/5041; H04L 41/5058; H04L 41/5096; H04L 43/00; H04L 43/02; H04L 43/04; H04L 43/06; H04L 43/062; H04L 43/065; H04L 43/08; H04L 43/0805; H04L 43/0852; H04L 43/0864; H04L 43/12; H04L 43/50;
(Continued)

(56) References Cited

U.S. PATENT DOCUMENTS 7,823,204 B2   10/2010  Gupta et al.
7,843,843 B1 * 11/2010  Papp, III ................. H04L 43/00
                                               370/252
(Continued)

*Primary Examiner* — Greg C Bengzon
(74) *Attorney, Agent, or Firm* — Patterson + Sheridan, LLP

(57) ABSTRACT

Techniques for service level performance updates based on network level factors are described. by establishing a cooperative model between a network fabric and service proxies to enhance the service mesh failure management primitives as well as bring in network level intelligence in service (service instance) placement decisions in the fabric. A virtual network edge (VNE) instance interacts with the network fabric including the next level switches (such as a top of rack switch) and a network controller in order to determine a network level health-score and a modulated health-score for a service instance executing on the node. The modulated health score causes actions such as an influence on load balancing, request routing, rolling upgrades, canary deployments, change in the utilization of network resources, a downgrade of service, etc., based on the network level health-score.

20 Claims, 5 Drawing Sheets

(51) Int. Cl.
    *H04L 43/0882* (2022.01)
    *G06F 9/455* (2018.01)
    *H04L 41/5009* (2022.01)

(52) U.S. Cl.
    CPC .......... *H04L 43/0882* (2013.01); *H04L 47/11* (2013.01); *G06F 2009/45595* (2013.01)

(58) Field of Classification Search
    CPC ....... H04L 45/02; H04L 45/125; H04L 45/28; H04L 45/302; H04L 45/306; H04L 45/38; H04L 47/125; H04L 47/22; H04L 47/24; H04L 47/283; H04L 47/286; H04L 47/781; H04L 47/825; H04L 61/1511; H04L 61/1523; H04L 61/2503; H04L 63/061; H04L 67/10; H04L 67/1008; H04L 67/141; H04L 67/18; H04L 67/327; H04L 69/40; G06F 9/45558; G06F 2009/45595; G06F 11/30; G06F 16/285; G06F 16/955; G06F 17/18; G06F 2209/542; G06F 8/60; G06F 9/54; H04W 28/02; H04W 28/0284; H04W 48/06; H04W 84/04; H04W 84/042
    See application file for complete search history.

(56) References Cited

U.S. PATENT DOCUMENTS

| | | | |
|---|---|---|---|
| 7,979,368 B2 | 7/2011 | Kapoor et al. | |
| 8,131,838 B2* | 3/2012 | Bornhoevd | G06F 9/54 709/217 |
| 8,316,438 B1* | 11/2012 | Bush | H04L 12/66 726/22 |
| 8,381,297 B2 | 2/2013 | Touboul | |
| 8,489,720 B1* | 7/2013 | Morford | H04L 43/0858 709/225 |
| 8,762,367 B2 | 6/2014 | Burger | G06F 16/24545 707/718 |
| 9,043,453 B1* | 5/2015 | Kielhofner | H04L 29/08072 709/223 |
| 9,270,559 B2 | 2/2016 | Raleigh et al. | |
| 9,407,509 B2 | 8/2016 | Porras et al. | |
| 9,805,345 B1* | 10/2017 | Dailianas | G06Q 20/102 |
| 9,998,339 B1* | 6/2018 | Brajkovic | G06F 11/3051 |
| 10,033,602 B1* | 7/2018 | Russell | H04L 43/20 |
| 10,044,581 B1* | 8/2018 | Russell | H04L 43/20 |
| 10,142,254 B1* | 11/2018 | Olofsson | H04L 47/70 |
| 10,230,586 B2* | 3/2019 | Cordray | H04L 41/082 |
| 10,462,061 B1* | 10/2019 | Lin | H04L 47/805 |
| 10,623,390 B1* | 4/2020 | Rosenhouse | H04L 67/10 |
| 10,725,825 B2* | 7/2020 | Sindhu | G06F 15/17337 |
| 10,776,091 B1* | 9/2020 | Wagner | G06F 9/45558 |
| 10,819,562 B2* | 10/2020 | Parra | H04L 12/4633 |
| 10,846,788 B1* | 11/2020 | Klein | H04L 47/783 |
| 11,202,228 B2* | 12/2021 | Bartfai-Walcott | H04W 28/0231 |
| 2005/0232153 A1* | 10/2005 | Bishop | H04L 47/2475 370/235 |
| 2007/0104208 A1* | 5/2007 | Svensson | H04L 47/821 370/412 |
| 2007/0274337 A1* | 11/2007 | Purpura | H04L 41/00 370/465 |
| 2008/0025230 A1* | 1/2008 | Patel | H04L 41/5022 370/252 |
| 2008/0052387 A1* | 2/2008 | Heinz | H04L 67/22 709/223 |
| 2010/0131639 A1* | 5/2010 | Narayana | H04L 67/1027 709/224 |
| 2010/0162348 A1* | 6/2010 | Narayanan | H04L 63/105 726/1 |
| 2010/0177650 A1* | 7/2010 | Wittgreffe | H04L 41/5009 370/252 |
| 2010/0232370 A1* | 9/2010 | Jing | H04L 69/22 370/329 |
| 2011/0176551 A1* | 7/2011 | Chawla | H04L 47/22 370/395.31 |
| 2011/0185052 A1* | 7/2011 | Nakahira | H04L 47/11 709/223 |
| 2013/0145375 A1* | 6/2013 | Kang | G06F 9/45558 718/104 |
| 2013/0173756 A1* | 7/2013 | Luna | H04L 67/2828 709/219 |
| 2013/0203399 A1* | 8/2013 | Gupta | H04W 24/10 455/418 |
| 2014/0133293 A1* | 5/2014 | Ismail | H04W 28/0289 370/229 |
| 2014/0155043 A1* | 6/2014 | Gell | H04L 67/02 455/414.1 |
| 2014/0237118 A1* | 8/2014 | Matthews | H04L 47/2441 709/226 |
| 2014/0269269 A1* | 9/2014 | Kovvali | H04W 24/04 370/229 |
| 2015/0106502 A1* | 4/2015 | Shakhmetov | H04L 47/70 709/224 |
| 2015/0117213 A1* | 4/2015 | Pinheiro | H04L 47/2475 370/235 |
| 2015/0195150 A1* | 7/2015 | Ritter | H04M 15/8055 709/223 |
| 2015/0215845 A1* | 7/2015 | Pinheiro | H04W 48/06 455/418 |
| 2015/0222549 A1* | 8/2015 | Kakadia | H04L 43/0852 370/231 |
| 2015/0304409 A1* | 10/2015 | Steuer | G06F 9/5072 709/203 |
| 2015/0373588 A1* | 12/2015 | C K | H04L 41/5022 370/329 |
| 2016/0014632 A1* | 1/2016 | Siow | H04B 7/0417 370/230 |
| 2016/0043944 A1* | 2/2016 | Felstaine | H04L 47/12 370/389 |
| 2016/0062795 A1* | 3/2016 | Hu | H04L 67/1095 718/104 |
| 2016/0065421 A1* | 3/2016 | Barghouthi | H04L 67/322 707/783 |
| 2016/0080221 A1* | 3/2016 | Ramachandran | H04L 45/306 709/224 |
| 2016/0080502 A1* | 3/2016 | Yadav | H04L 43/0876 709/227 |
| 2016/0094629 A1* | 3/2016 | Abushaban | G06F 11/0715 709/226 |
| 2016/0112269 A1* | 4/2016 | Singh | H04L 41/0853 709/224 |
| 2016/0182286 A1* | 6/2016 | Lunden | H04L 47/245 370/254 |
| 2016/0262044 A1* | 9/2016 | Calin | H04L 47/2483 |
| 2016/0315912 A1* | 10/2016 | Mayya | H04L 12/4641 |
| 2016/0353461 A1* | 12/2016 | Vachuska | H04L 47/2441 |
| 2017/0006053 A1* | 1/2017 | Greenberg | G06F 21/566 |
| 2017/0013501 A1* | 1/2017 | Kim | H04W 48/06 |
| 2017/0063705 A1* | 3/2017 | Gilson | H04L 43/0852 |
| 2017/0078208 A1* | 3/2017 | Panin | H04L 47/24 |
| 2017/0098086 A1* | 4/2017 | Hoernecke | G06Q 10/0635 |
| 2017/0116016 A1* | 4/2017 | Kim | H04L 67/025 |
| 2017/0126564 A1* | 5/2017 | Mayya | H04L 63/0281 |
| 2017/0237710 A1* | 8/2017 | Mayya | H04L 45/64 726/13 |
| 2017/0244643 A1* | 8/2017 | Lawrence | H04L 67/10 |
| 2017/0245170 A1* | 8/2017 | Henry | H04L 47/2475 |
| 2017/0351241 A1* | 12/2017 | Bowers | G05B 19/406 |
| 2017/0353991 A1* | 12/2017 | Tapia | G06Q 10/20 |
| 2018/0006954 A1* | 1/2018 | Arora | H04L 47/20 |
| 2018/0062928 A1* | 3/2018 | Beveridge | H04L 41/0893 |
| 2018/0063201 A1* | 3/2018 | Zhang | H04W 76/15 |
| 2018/0091392 A1* | 3/2018 | Richards | H04L 43/045 |
| 2018/0091394 A1* | 3/2018 | Richards | H04L 41/0604 |
| 2018/0091401 A1* | 3/2018 | Richards | H04L 61/4511 |
| 2018/0091413 A1* | 3/2018 | Richards | H04L 43/14 |
| 2018/0115463 A1* | 4/2018 | Sinha | H04L 41/5067 |
| 2018/0123950 A1* | 5/2018 | Garg | H04L 63/0236 |

(56) References Cited

U.S. PATENT DOCUMENTS

| | | |
|---|---|---|
| 2019/0028407 A1* | 1/2019 | Perumal Vijayan .. H04L 67/322 |
| 2019/0042290 A1* | 2/2019 | Bailey ................. G06F 9/45558 |
| 2019/0045037 A1* | 2/2019 | Sukhomlinov ......... H04L 67/40 |
| 2019/0052551 A1* | 2/2019 | Barczynski ............ H04L 41/046 |
| 2019/0132211 A1* | 5/2019 | Yeung .................. H04L 41/145 |
| 2019/0141561 A1* | 5/2019 | Altay .................. H04L 12/1886 |
| 2019/0280932 A1* | 9/2019 | Gazzetti ............. H04L 41/0896 |
| 2019/0306076 A1* | 10/2019 | Masputra ............ H04L 47/2475 |
| 2019/0312784 A1* | 10/2019 | Altay ................... H04L 41/122 |
| 2020/0007413 A1* | 1/2020 | Kerpez ............... H04L 41/5003 |
| 2020/0007460 A1* | 1/2020 | Guim Bernat ........ H04L 47/765 |
| 2020/0034353 A1* | 1/2020 | Innocenti ................. H04L 9/50 |
| 2020/0036574 A1* | 1/2020 | Parra ...................... H04L 43/12 |
| 2020/0106706 A1* | 4/2020 | Mayya ................. H04L 45/306 |
| 2020/0119992 A1* | 4/2020 | Yan ......................... H04L 43/16 |
| 2020/0267051 A1* | 8/2020 | Ranjbar ............. G06F 9/45558 |
| 2021/0194821 A1* | 6/2021 | Guim Bernat ........ G06F 9/5011 |
| 2023/0291674 A1* | 9/2023 | Richards ................ H04L 43/08 |
| | | 709/224 |

* cited by examiner

NETWORK-ASSISTED APPLICATION-LAYER REQUEST FLOW MANAGEMENT IN SERVICE MESHES

TECHNICAL FIELD

Embodiments presented in this disclosure generally relate deployment and management of network fabrics and service meshes within the network fabrics. More specifically, embodiments disclosed herein include using network level performance insights to modulate health scores for service level applications, services, and/or micro-services.

BACKGROUND

In current network fabric designs and implementations, there is an increasing focus on using service meshes to provide Layer 7 (L7) services for applications on the network. A sidecar proxy is a proxy instance that is dedicated to a specific application instance (e.g., per application container pod) and communicates with other sidecar proxies executing on different nodes for information regarding the application.

Sidecar proxies are often used due to their utility and reliability in providing required services. For instance, middle proxies are not close enough to the workload to obtain information about the application instances without sending a query to each of the nodes. Additionally, middle proxies can be a single point of failure for a plurality of nodes. Sidecar proxies solve these issues by executing in tandem with the application instances and providing a distributed information source such that the failure of one does not condemn the whole system. However, sidecar proxies are inefficient in obtaining information regarding application/service instances executing on other nodes and the network wide service level performance of the application/service and updating a performance of the service instance based on the network wide service level performance.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
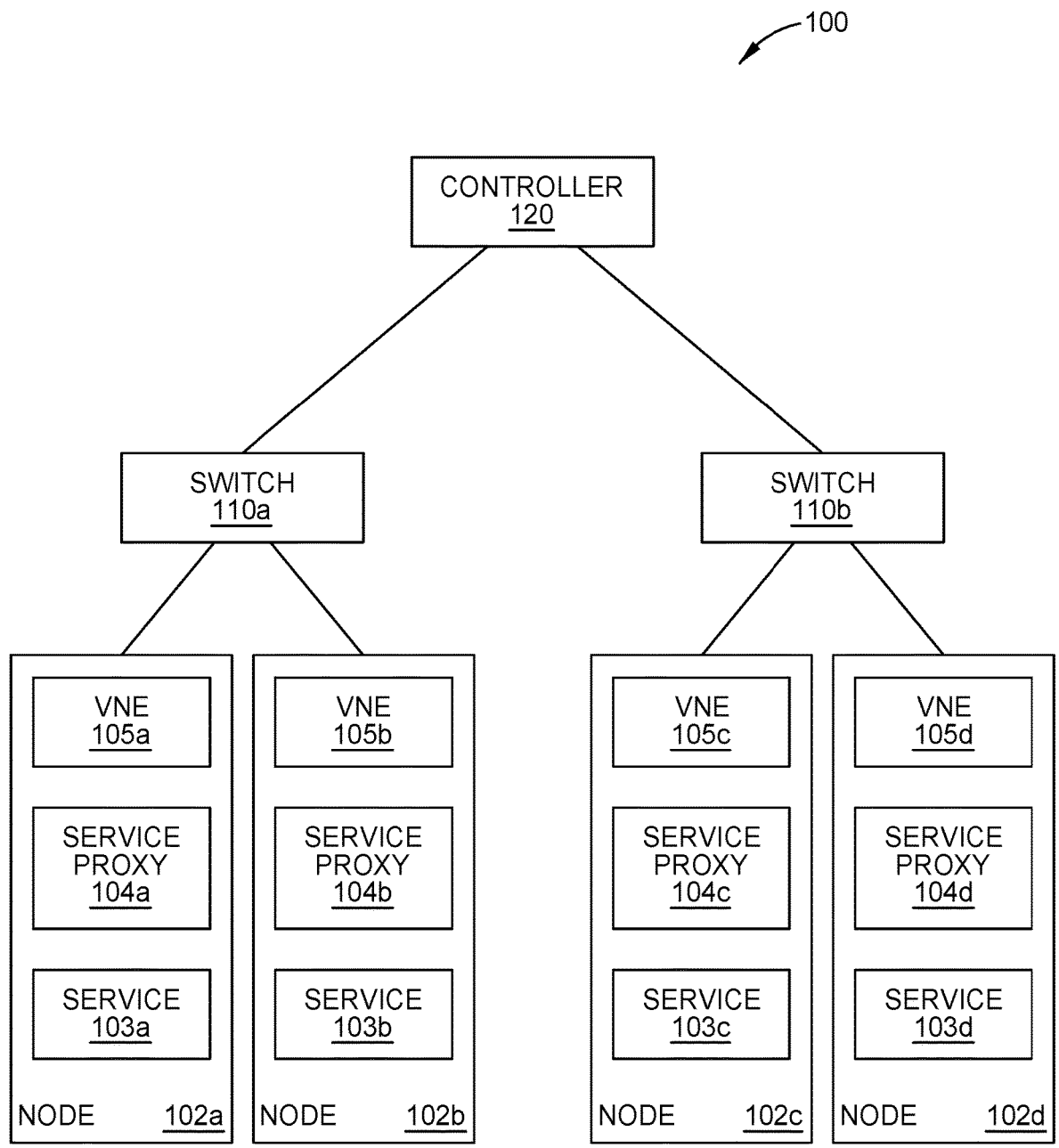
FIG. 1 illustrates a network, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for service level performance updates based on network level factors including: receiving at a virtual network edge (VNE) instance on a node, one or more network health indicators, determining from the one or more network health indicators, a network level health-score, determining from the network level health-score a modulated health-score for a service instance executing on the node, and updating a health-score of the service instance at the service proxy. Other embodiments of this aspect include corresponding computer systems, apparatus, and computer programs recorded on one or more computer storage devices, each configured to perform the actions of the methods.

One example embodiment includes a system for service level performance updates based on network level factors, including: a processor; and a memory including instructions which, when executed on the processor, performs an operation. The operation includes: receiving at a virtual network edge (VNE) instance on a node, one or more network health indicators, determining from the one or more network health indicators, a network level health-score, determining from the network level health-score a modulated health-score for a service instance executing on the node, and updating a health-score of the service instance at the service proxy.

One example embodiment includes a computer program product for service level performance updates based on network level factors, the computer program product including a non-transitory computer-readable medium program having program instructions embodied therewith, the program instructions executable by a processor to perform an operation. The operation includes: receiving at a virtual network edge (VNE) instance on a node, one or more network health indicators, determining from the one or more network health indicators, a network level health-score, determining from the network level health-score a modulated health-score for a service instance executing on the node, and updating a health-score of the service instance at the service proxy.

Example Embodiments

Service mesh data plane implementations in networks include proxies such as sidecar proxies. While these sidecar proxies delegate certain functions to other network components, these proxies do not have detailed insight into network fabric-level events such as congestion or service-level agreement (SLA) violations at network edges. This lack of insight into network fabric-level events may have adverse effects on services that make application traffic flow decisions based only on layer 7 (L7) parameters (ex: application load balancers, etc.). For example, an application load balancer may continue routing traffic via network elements that are congested and/or have failed for a period of time before the load balancer can detect the issue.

In some examples, a service mesh manages service-level (i.e., L7) communication. The service meshes provide powerful primitives that can be used for at least three failure management strategies. For example, service meshes implement: dynamic routing, which can be used for different release and testing strategies such as canary routing, traffic shadowing, or blue/green deployments; resilience, which mitigates the impact of failures through strategies such as circuit breaking and rate limiting; and observability, which helps improve response time of application behavior by collecting metrics and adding context (e.g., tracing data) to service-to-service communication.

As discussed above, a service mesh is usually implemented as a collection of inter-connected sidecar proxies where sidecar proxies are typically deployed per container pod on nodes. Sidecar proxies often delegate responsibilities including service discovery and service health to external providers (such as a datacenter fabric) in order to conserve bandwidth at the container and node. As described herein, the sidecar proxies may delegate service discovery and service health to a virtual network edge (VNE) instance on the node.

The systems and methods described herein provide for service level performance updates based on network level factors by establishing a co-operative model between a network fabric and service proxies to enhance the service mesh failure management primitives as well as bring in network level intelligence in service (service instance) placement decisions in the fabric. The VNE instance, with delegated responsibilities, interacts with the network fabric including the next level switches (such as a top of rack switch) and a network controller in order to determine a network level health-score and a modulated health-score for a service instance executing on the node. The modulated health score causes actions such as an influence on load balancing, request routing, rolling upgrades, canary deployments, change in the utilization of network resources, a downgrade of service, etc., based on the network level health-score.

FIG. 1 illustrates a network, according to one embodiment. The various elements of FIG. 1 communicate over a network using network switches such as through a leaf spine architecture, e.g., a CLOS network topology, although embodiments are not limited to this example and are applicable to any datacenter fabric or other network fabric monitored by a network controller.

The compute nodes, nodes 102a-102d, may be any computer systems configured to communicate with a network, such as computer systems in a datacenter. In some examples, the nodes 102a-d may host one or more container environments, such as Docker or Kubernetes containers which may be hosted on server computers. Each container environment includes a stand-alone executable software package which provides particular services and includes every element needed to run the software package, including code, runtime, system libraries, settings, etc. The container environments may implement a Container Network Interface (CNI) networking model or a Container Network Model (CNM) to perform local programming.

The nodes 102a-d also execute one or more service instances 103a-103d. In some examples, the one or more service instances 103a-103d comprise an application instance for an application, where the application instance is executed in a container environment. The varying nodes may execute application instances of various services. In some examples, the service instances 103a-103d executing on the various nodes may differ in configuration and/or application type. The application instances may be executed as part of a service mesh. The service mesh comprises a configurable infrastructure layer for one or more applications.

In some examples, the nodes 102a-d each comprise a VNE instance (e.g., the VNEs 105a-105d) executing on the node. The VNEs 105a-d comprises executable software which identifies and authenticates end points and registers end-point identification information in a fabric host-tracking database. The VNEs may also contain a port in each container pod namespace and act as a bridge between the nodes 102 and the top of rack (ToR) switches (e.g., switches 110a-110b).

As described herein, each local VNE instance acts as the proxy for any delegated L7 service. A delegated L7 service is one in which the network fabric provides policy or statistics for enforcement to the service proxies. In some examples, the actual enforcement of any application behavior can still be done by the service proxy 104 (e.g., a sidecar proxy).

In some examples, service proxies 104a-d execute in the container environment on the respective nodes. The service proxies 103a-d may be configured to implement enforcement of policies relating to the respective service instances. For example, the service proxy 103a may function as an Envoy sidecar proxy to enforce policies for an Envoy service mesh. The service proxy 103a may be further configured to communicate with the VNE 105a to obtain information regarding the service/application. For example, the network fabric may be integrated with the service mesh by allowing the VNE 105a to provide key services to either the service instance 103a or the service proxy 104a.

In some examples, the service proxies 104a-d query the VNE instances for performing specific checks such as determining health of a service, endpoint discovery, rate limiting, etc. In response, the VNE instance delegates to the next-hop switch, e.g., the switches 110a-110b. The fabric controller, e.g., the controller 120, downloads the requested information into the switches 110a-110b and the response from switch is then cached at the VNE instance level. Thus allowing the node-level proxy to provide delegated service health statistics to the mesh proxies in a hub-and-spoke model.

In some examples, the VNE routes network traffic through the switches 110a-110b. The switches 110a-110b comprise network switches which interconnect nodes in a network (such as nodes in a datacenter). In some examples the switches 110a-110b may be connected to one or more spines based on a leaf/spine datacenter fabric, such as the CLOS network topology.

The network controller 120 is a central entity that manages operation of a network fabric, such as by providing overlay reachability information and end points-to-routing location mapping. An example of a fabric controller is the Cisco Application Policy Infrastructure Controller (APIC) which is a unifying point of automation and management for the Cisco Application Centric Infrastructure (ACI) fabric. The network controller 120 may be implemented on a computing system that is communicatively coupled to the nodes through the network fabric architecture.

In some examples, the network controller 120 also functions as a container orchestrator which acts as a resource manager for container environments operating on nodes. The container orchestrator may allocate and provide resources to container environments, provide instructions to systems instructions executing container environments, obtain and distribute attribute data regarding container environments, and otherwise manage deployment and implementation of container environments.

FIG. 2 depicts a system flow diagram for service level performance updates based on network level factors, according to one embodiment. The examples discussed herein refer to VNE 105a, but may also apply to any VNE instance in the network 100. In some examples, VNE instances route and monitor application data relating to service instance. For example, as shown in steps 202 and 204, the VNE 105a routes and monitors outgoing and incoming application data traffic for the service instance 103a. In some examples, the VNE 105a further routes the application data to a destination via the network switch 110a.

In some examples, the VNE 105a is also delegated service health monitoring functions. For example, at step 206, the service proxy 104a associated with the service instance 102a sends a service health request to the VNE 105a. When the VNE 105a receives the service health request from the service proxy 104a, the VNE 105a queries a next-level network element for the one or more network health indicators at step 208. For example, the VNE 105a will query and/or delegate the request for service health request to the switch 110a.

At step 210, the switch 110a queries the controller 120 for the network level network health indicators. At step 212, the fabric controller, controller 120, downloads the requested information into the switch 110a and at step 214 the response (which includes the network health indicators from the switch 110a) is cached at the VNE level in the VNE 105a from the switch 110a. For example, as also shown in block 252 of method 200 in FIG. 2b, the VNE 105a receives the one or more network health indicators.

Figure 2A:
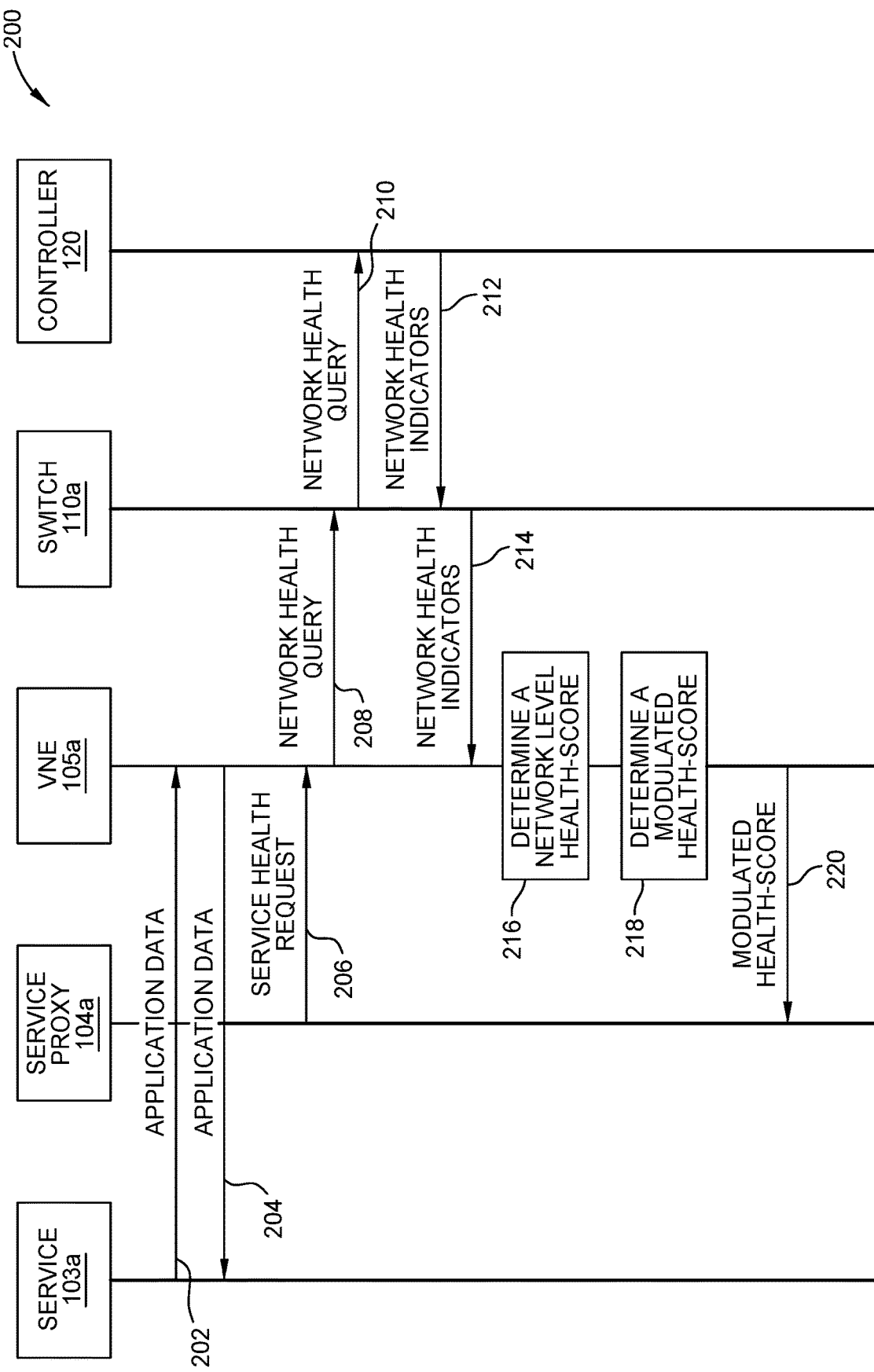
FIG. 2A depicts a system flow diagram for service level performance updates based on network level factors, according to one embodiment.
Figure 2B:
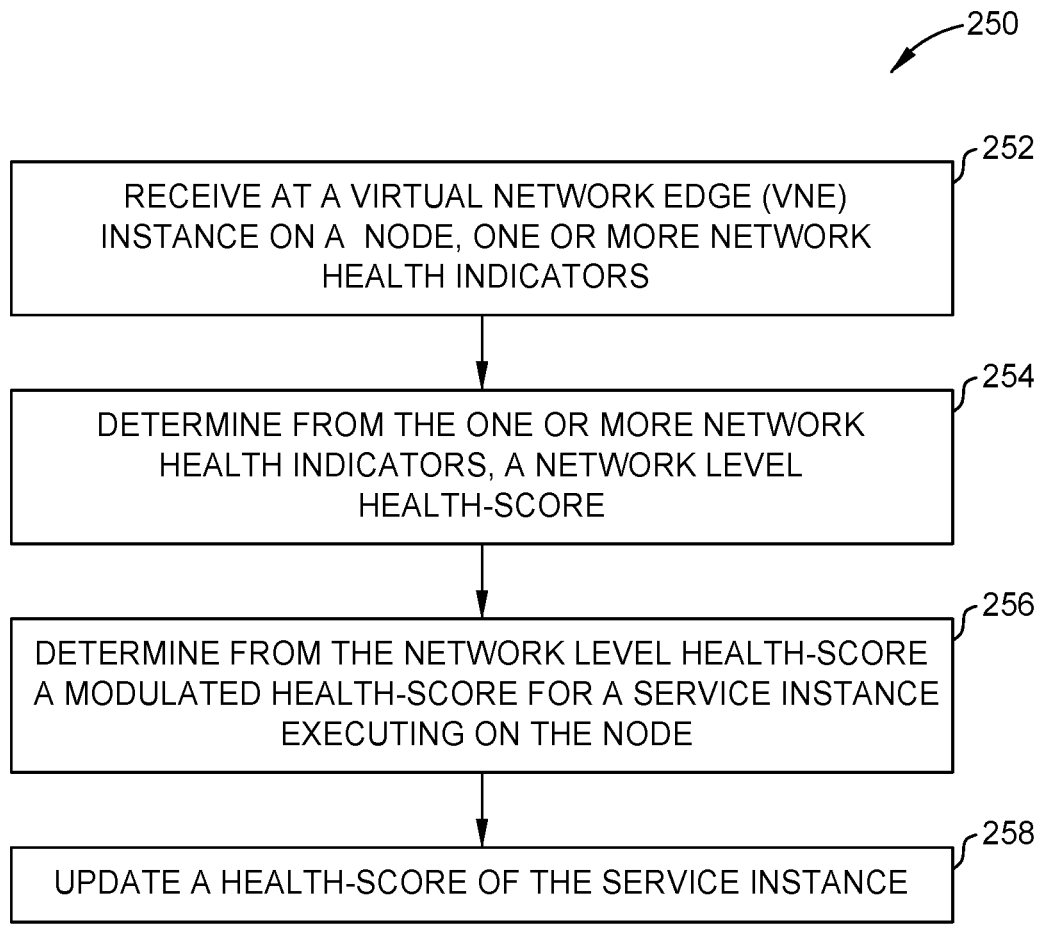
FIG. 2B depicts a method for service level performance updates based on network level factors.

At step 216 in FIG. 2A and at block 254 in FIG. 2B, the VNE 105a determines from the network health indicators, a network level health-score and at step 218 in FIG. 2A and at block 256 in FIG. 2B, the VNE 105a determines a modulated health-score for the for the service instance 103a executing on the node 102a.

Figure 4:
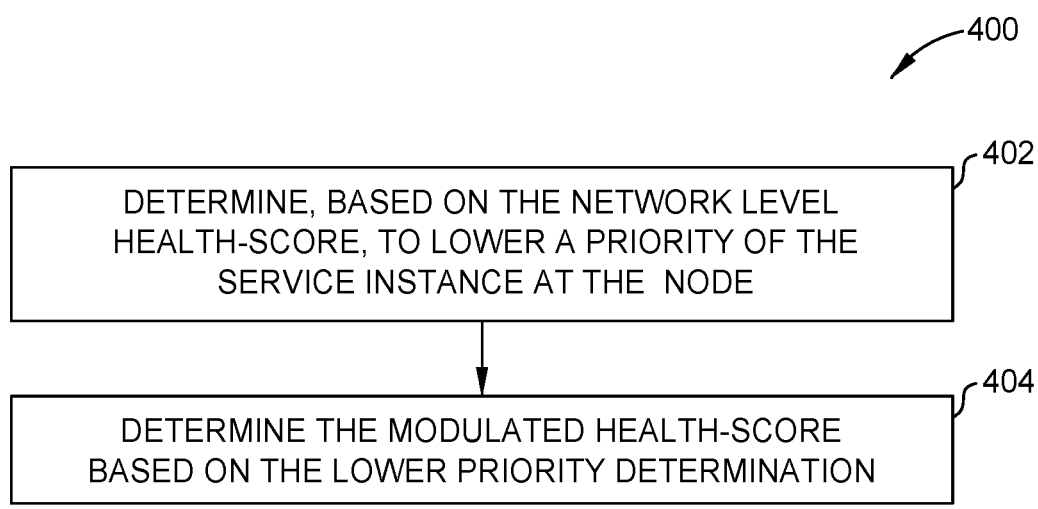
FIG. 4 depicts a method for determining a modulated health-score, according to one embodiment.

In some examples, the VNE 105a uses the upstream/external/global signals received in the network health indicators 212 to determine the network level health-score and in turn, the VNE 105a modulates/generates/changes the health-score of a particular app/service, e.g., the service instance 103a that is located behind an affected leaf/spine. In some examples, the modulated health-score influences an upstream L7-based service (such as a load-balancer) to degrade the availability of a specific service instance and lower its priority to serve traffic. This results in a reduced level of service/application requests being routed to the degraded instance, (e.g., 103a) which can be temporarily degraded and/or migrated from the node 102a. For example, as described in relation to method 400 of FIG. 4, the VNE 105a determines, based on the network level health-score, to lower a priority of the service instance at the node at block 402; and at block 404, determines the modulated health-score based on the lower priority determination, wherein the modulated health-score comprises a health-score for the service instance which lowers the priority of the service instance.

Figure 3:
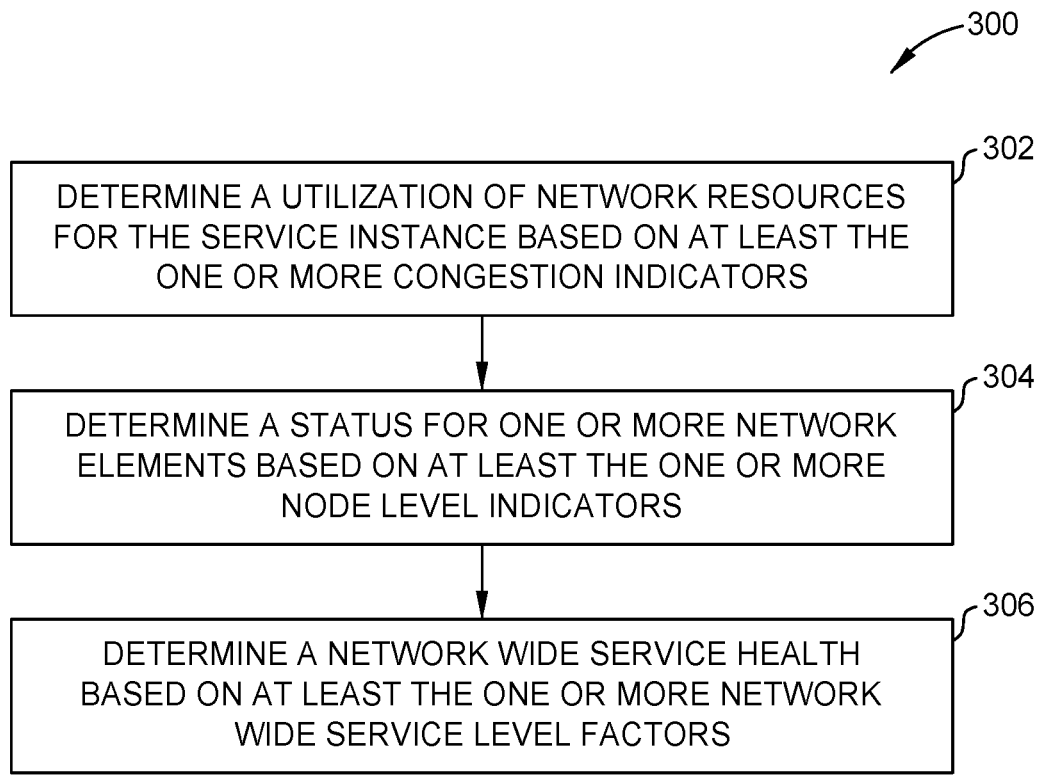
FIG. 3 depicts a method for determining a network level health score, according to one embodiment.

In some examples, the network health indicators include one or more congestion indicators, one or more node level indicators, and one or more network wide service level factors. For example, the congestion indicators may include indications of resource exhaustion or over-utilization at the leaf switch layer. These indicators may include signals related congestion-related resources such as buffer space, TCAM table space for ACLs, L2/L3 tables at a leaf that are needed to provide services to the service instance, etc. In some examples, the VNE 105a queries an upstream leaf for resource utilization metrics and determines the service utilization load on the leaf. For example, at block 302 of method 300 in FIG. 3, the VNE 105a determines a utilization of network resources for the service instance based on at least the one or more congestion indicators. In some examples, when the service and/or the service instance is consuming a disproportionate amount of resources at the leaf, then the health-score is modulated/degraded in order to reapportion the resource consumption. In such cases, the health-score values may be changed using a strategy such as Additive Increase Multiplicative Decrease feedback control algorithm (among others) to reduce the service resource utilization.

In some examples, the determination of the a network level health-score and the related modulation of the service instance health score is due to real or impending resource exhaustion or congestion being experienced by the upstream network as demonstrated by a queue buildup, such as in an L2/L3 table buildup etc. This congestion may be proactively triaged by the VNE instances by modulating/degrading health-scores to specific services instances hosted on the nodes in order to temporarily divert traffic.

In some examples, the determination of the a network level health-score and the related modulation of the service instance health score is related to a measure of the ratio of resource utilization of an service instance in the upstream switch, e.g., the switch 110a, to that service instance's usefulness to the service overall. For example, when the ratio is computed to be higher than a pre-defined threshold, then the VNE 105a modulates/degrades the service instance health score with an intent to evict the service instance 103a from the node 102a.

For example, the network fabric may track the percentage of resources consumed by a specific service/application instance as well as the percentage of overall traffic at the switch 110a consumed by the service instance 103a. In an example, where the percentage of resources used by the service instance is not proportional with the percentage of overall traffic for that service instance, then the affects the service instance are determined to be negatively affecting the switch and thus the associated VNE signals a an eviction in the modulated health-score, where the service instance is evicted/removed/transitioned from the node 102a.

In some examples, the one or more node level indicators include Node-level maintenance and/or high availability (HA) events. For example these indicators may include proactive notifications for nodes undergoing planned updates/maintenance. Returning to FIG. 3, at block 304, the VNE 105a determines a status for one or more network elements based on at least the one or more node level indicators. In this example, the controller 120 interacts with the container orchestrator and is notified of any upcoming maintenance events and informs the VNE 105a via the network health indicators as discussed in relation to steps 212 to 214 in FIG. 2A. In response, the VNEs 105a-d begin proactively modulating/degrading the health-score of the service instances located on the to-be affected hosts. For example, the health-score values change similar to a step-function at initiation and termination of the maintenance window thus preventing service instance traffic interruption.

In some examples, the one or more network wide service level factors include service-level insights from sensors in the network. This category of indicators relate to telemetry and other data gathered from various service/application level sensors which may include SLA violations and/or metrics that are customized for the specific service/application. At block 306 of FIG. 3, the VNE 105*a* determines a network wide service health based on at least the one or more network wide service level factors.

In some examples, AppD and/or other monitoring solutions are integrated with the controller 120 to provide visibility into issues/problems with services instances such as policy violations, anomalous network activity, maintenance (e.g., application needs to be updated), vulnerability alerts with application versions, etc. In general, these indicators relate to service health as measured by an external entity (e.g., the controller 120) which is integrated with the network fabric and not just service level health as computed by a service load balancer, etc.

In this example, the VNE instances 105*a*-*d* modulate/adjust the health-score in a spectrum based on the severity of the issue and the urgency to address it. For example, the health score for the service-instance may be downgraded severely for a critical issue and/or may also be downgraded to a lower degree for less critical issues in order for the service mesh to gradually adjust.

At step 220 in FIG. 2A and at block 258 in FIG. 2B, the VNE 105*a* provides the modulated health score to the service proxy 104*a* which in turn updates the modulated health score for the service 103*a*. In some examples, the service proxy 104*a* reports the modulated health-score to one or more of a network traffic controller or network traffic metrics collector on behalf of the service instance, to enhance the service mesh failure management primitives with the information derived from the network level factors.

Figure 5:
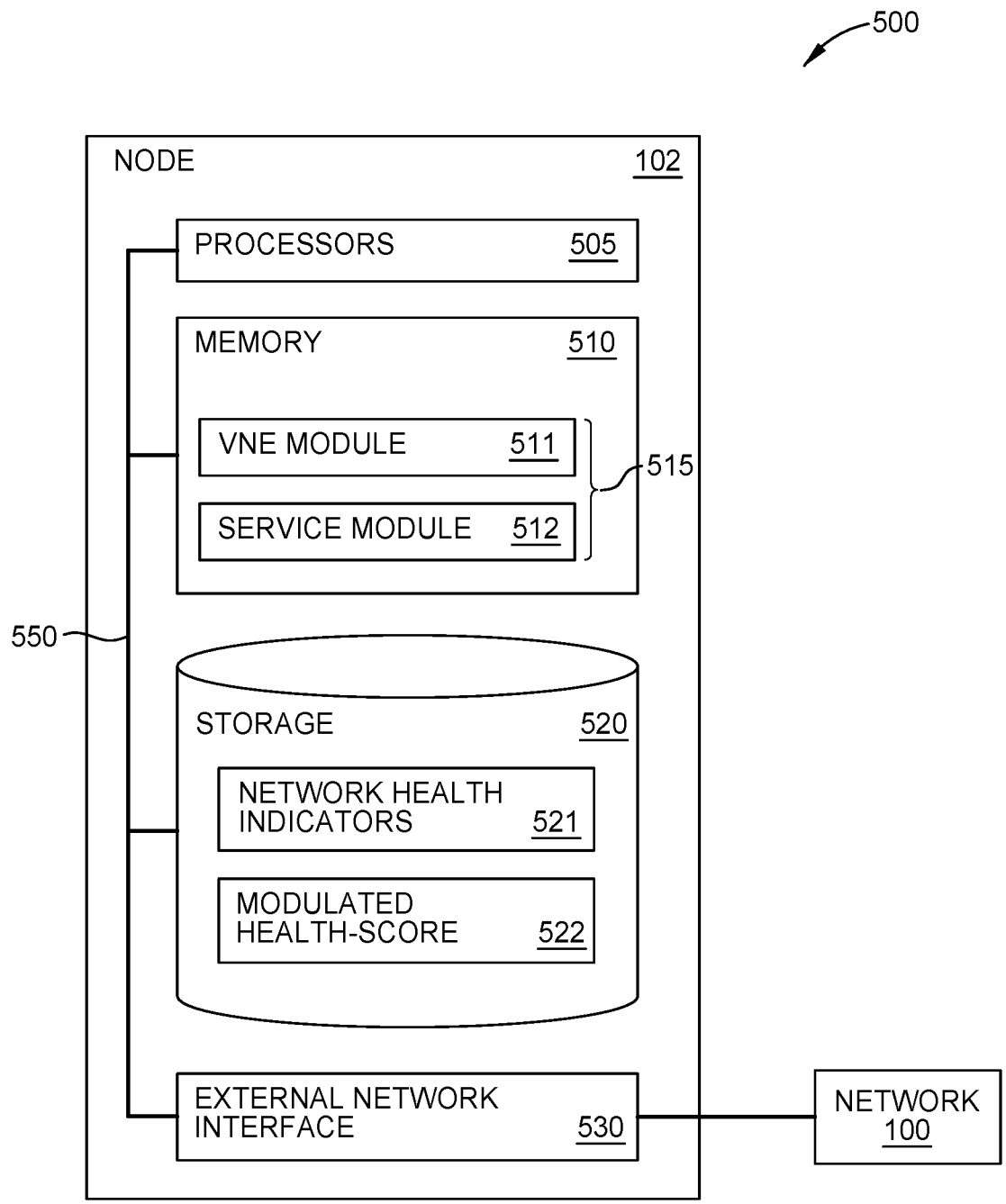
FIG. 5 illustrates a block diagram of a virtual network edge instance, according to one embodiment.

FIG. 5 illustrates a block diagram of a node, according to one embodiment. The arrangement 500 may include a computer embodied as a node and configured to perform the methods described herein. The node 102 is shown in the form of a general-purpose computing device. The components of node 102 may include, but are not limited to processing units or processors 505, a system memory, memory 510, a storage system, storage 520, network interface 530, and a bus 550 that couples various system components including the system memory, memory 510 and storage system, storage 520, to processors 505 along with the network interface 530 and various input/output components and the network 100. In other embodiments, arrangement 500 is distributed and includes a plurality of discrete computing devices that are connected through wired or wireless networking.

Bus 550 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Node 102 typically includes a variety of computer system readable media. Such media may be any available media that is accessible by Node 102, and it includes both volatile and non-volatile media, removable and non-removable media.

Memory 510 can include computer system readable media in the form of volatile memory, such as random access memory (RAM) and/or cache memory. Node 102 may further include other removable/non-removable, volatile/non-volatile computer system storage media. In some examples, 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system, storage 520, can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage 520 may include media for storing network health indicators 521, modulated health-scores 522 and other data described herein.

Memory 510 may include a plurality of program modules 515 for performing various functions related to the node described herein. The program modules 515 generally include program code that is executable by one or more of the processors 505. As shown, program modules 515 include the VNE module 511 and service modules 512 to perform the functions related to the VNE and service instances on a node. The program modules 515 may also interact with each other and storage system, storage 520, to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for service level performance updates based on network level factors, the method comprising:
   receiving, at a virtual network edge (VNE) instance on a node, a service health request from a service proxy on the node, wherein the service health request indicates a delegation of application layer service health monitoring from the service proxy to the VNE instance, wherein the VNE instance performs the delegated application layer service health monitoring for the service proxy, wherein the VNE instance is collocated on the node with a service instance executing on the node and the service proxy executing on the node, wherein the service proxy controls application behaviors for the service instance based on an application layer health-score of the service instance;
   receiving, at the VNE instance, one or more network health indicators comprising network level indicators generated at a network controller for a network fabric and received from a delegated service health request network switch located between the node and the network controller in the network fabric;
   determining, at the VNE instance and from the one or more network health indicators, a network level health-score for the network fabric;
   determining, at the VNE instance and from the network level health-score, a modulated health-score for the service instance; and
   updating the application layer health-score of the service instance at the service proxy to cause the service instance to alter its application behaviors within the service mesh based on the modulated health-score.

2. The method of claim 1, further comprising:
   in response to receiving the health service request, querying a next-level network element for the one or more network health indicators; and
   wherein the one or more network health indicators are received from the next-level network element in response to the query.

3. The method of claim 2, wherein updating the health-score of the service instance comprises:
   providing the modulated health-score to the service proxy, wherein the service proxy reports the modulated health-score to at least one of a network traffic controller and network traffic metrics collector on behalf of the service instance.

4. The method of claim 1, wherein the VNE instance serves as a proxy for one or more delegated services at the node.

5. The method of claim 1, wherein the one or more network health indicators comprise at least one of:
   a congestion indicator;
   a node level indicator; and
   a network wide service level factor.

6. The method of claim 5, wherein determining the network level health-score comprises at least one of:

determining a utilization of network resources for the service instance based on at least the congestion indicator;

determining a status for one or more network elements one based on at least the node level indicator; and determining a network wide service health based on at least the network wide service level factor.

7. The method of claim 1, wherein determining the modulated health-score for the service instance comprises:

determining, based on the network level health-score, to lower a priority of the service instance at the node; and determining the modulated health-score based on the lower priority determination, wherein the modulated health-score comprises a health-score for the service instance which lowers the priority of the service instance such that a level of service to the service instance is lowered.

8. A system for service level performance updates based on network level factors, comprising:

a processor; and a memory comprising instructions which, when executed on the processor, performs an operation, the operation comprising:

receiving, at a virtual network edge (VNE) instance on a node, a service health request from a service proxy on the node, wherein the service health request indicates a delegation of application layer service health monitoring from the service proxy to the VNE instance, wherein the VNE instance performs the delegated application layer service health monitoring for the service proxy, wherein the VNE instance is collocated on the node with a service instance executing on the node and the service proxy executing on the node, wherein the service proxy controls application behaviors for the service instance based on an application layer health-score of the service instance;

receiving, at the VNE instance, one or more network health indicators comprising network level indicators generated at a network controller for a network fabric and received from a delegated service health request network switch located between the node and the network controller in the network fabric;

determining, at the VNE instance and from the one or more network health indicators, a network level health-score for the network fabric;

determining, at the VNE instance and from the network level health-score, a modulated health-score for the service instance; and updating the application layer health-score of the service instance at the service proxy to cause the service instance to alter its application behaviors within the service mesh based on the modulated health-score.

9. The system of claim 8, wherein the operation further comprises:

in response to receiving the health service request, querying a next-level network element for the one or more network health indicators; and wherein the one or more network health indicators are received from the next-level network element in response to the query.

10. The system of claim 9, wherein updating the health-score of the service instance comprises:

providing the modulated health-score to the service proxy, wherein the service proxy reports the modulated health-score to at least one of a network traffic controller and network traffic metrics collector on behalf of the service instance.

11. The system of claim 8, wherein the VNE instance serves as a proxy for one or more delegated services at the node.

12. The system of claim 8, wherein the one or more network health indicators comprise at least one of:

a congestion indicator;

a node level indicator; and a network wide service level factor.

13. The system of claim 12, wherein determining the network level health-score comprises at least one of:

determining a utilization of network resources for the service instance based on at least the congestion indicator;

determining a status for one or more network elements one based on at least the node level indicator; and determining a network wide service health based on at least the network wide service level factor.

14. The system of claim 8, wherein determining the modulated health-score for the service instance comprises:

determining, based on the network level health-score, to lower a priority of the service instance at the node; and determining the modulated health-score based on the lower priority determination, wherein the modulated health-score comprises a health-score for the service instance which lowers the priority of the service instance such that a level of service to the service instance is lowered.

15. A non-transitory computer-readable medium, the non-transitory computer-readable medium having program instructions embodied therewith, the program instructions are executed by a processor to perform an operation comprising:

receiving, at a virtual network edge (VNE) instance on a node, a service health request from a service proxy on the node, wherein the service health request indicates a delegation of application layer service health monitoring from the service proxy to the VNE instance, wherein the VNE instance performs the delegated application layer service health monitoring for the service proxy, wherein the VNE instance is collocated on the node with a service instance executing on the node and the service proxy executing on the node, wherein the service proxy controls application behaviors for the service instance based on an application layer health-score of the service instance;

receiving, at the VNE instance, one or more network health indicators comprising network level indicators generated at a network controller for a network fabric and received from a delegated service health request network switch located between the node and the network controller in the network fabric;

determining, at the VNE instance and from the one or more network health indicators, a network level health-score;

determining, at the VNE and from the network level health-score a modulated health-score for a service instance; and updating the application layer health-score of the service instance at a service proxy to cause the service instance to alter its application behaviors within the service mesh based on the modulated health-score.

16. The computer program product of claim 15, wherein the operation further comprises:

in response to receiving the health service request, querying a next-level network element for the one or more network health indicators; and wherein the one or more network health indicators are received from the next-level network element in response to the query.

17. The computer program product of claim 16, wherein updating the health-score of the service instance comprises:

providing the modulated health-score to the service proxy, wherein the service proxy reports the modulated health-score to at least one of a network traffic controller and network traffic metrics collector on behalf of the service instance.

18. The computer program product of claim 15, wherein the one or more network health indicators comprise at least one of:

a congestion indicator;

a node level indicator; and a network wide service level factor.

19. The computer program product of claim 18, wherein determining the network level health-score comprises at least one of:

determining a utilization of network resources for the service instance based on at least the congestion indicator;

determining a status for one or more network elements one based on at least the node level indicator; and determining a network wide service health based on at least the network wide service level factor.

20. The computer program product of claim 15, wherein determining the modulated health-score for the service instance comprises:

determining, based on the network level health-score, to lower a priority of the service instance at the node; and determining the modulated health-score based on the lower priority determination, wherein the modulated health-score comprises a health-score for the service instance which lowers the priority of the service instance such that a level of service to the service instance is lowered.

* * * * *

UNITED STATES PATENT AND TRADEMARK OFFICE
CERTIFICATE OF CORRECTION

PATENT NO. : 11,916,758 B2
APPLICATION NO. : 16/530874
DATED : February 27, 2024
INVENTOR(S) : Sourabh S. Patwardhan et al.

Page 1 of 1

It is certified that error appears in the above-identified patent and that said Letters Patent is hereby corrected as shown below:

On the Title Page

In item (57), in Column 2, in "Abstract", Line 2, delete "described." and insert -- described --.

In the Specification

In Column 6, Line 18, delete "the a" and insert -- the --.

In Column 6, Line 27, delete "the a" and insert -- the --.

In Column 6, Line 43, delete "affects" and insert -- effects --.

In Column 6, Line 45, delete "a an" and insert -- an --.

In the Claims

In Column 12, Line 66, in Claim 16, delete "The computer program product" and insert -- The non-transitory computer-readable medium --.

In Column 13, Line 7, in Claim 17, delete "The computer program product" and insert -- The non-transitory computer-readable medium --.

In Column 13, Line 14, in Claim 18, delete "The computer program product" and insert -- The non-transitory computer-readable medium --.

In Column 13, Line 20, in Claim 19, delete "The computer program product" and insert -- The non-transitory computer-readable medium --.

In Column 14, Line 9, in Claim 20, delete "The computer program product" and insert -- The non-transitory computer-readable medium --.

Signed and Sealed this
Third Day of September, 2024

Katherine Kelly Vidal
*Director of the United States Patent and Trademark Office*